United States Patent
Lehre et al.

(10) Patent No.: US 7,991,526 B2
(45) Date of Patent: Aug. 2, 2011

(54) METHOD AND DEVICE FOR CONTROLLING AT LEAST ONE OBJECT DETECTION SENSOR

(75) Inventors: Klaus Lehre, Malsch (DE); Martin Randler, Immenstaad (DE); Iris Nadine Koesters, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 11/992,346
(22) PCT Filed: Aug. 15, 2006
(86) PCT No.: PCT/EP2006/065298
§ 371 (c)(1), (2), (4) Date: Mar. 24, 2009
(87) PCT Pub. No.: WO2007/036390
PCT Pub. Date: Apr. 5, 2007

(65) Prior Publication Data
US 2009/0204289 A1    Aug. 13, 2009

(30) Foreign Application Priority Data
Sep. 27, 2005  (DE) .......................... 10 2005 046 045

(51) Int. Cl.
*G06F 7/00* (2006.01)
(52) U.S. Cl. ......................................................... 701/36
(58) Field of Classification Search .................... 701/36, 701/45, 301
See application file for complete search history.

(56) References Cited

U.S. PATENT DOCUMENTS
2003/0167113 A1* 9/2003 Weilkes et al. ................. 701/45
2006/0250297 A1* 11/2006 Prakah-Asante et al. ....... 342/70

FOREIGN PATENT DOCUMENTS
DE  199 34 670   12/2000
DE  101 47 443   4/2003
DE  103 60 890   7/2005

* cited by examiner

*Primary Examiner* — Kim T Nguyen
(74) *Attorney, Agent, or Firm* — Kenyon & Kenyon LLP

(57) ABSTRACT

A method and a device for controlling at least one object detection sensor for a motor vehicle, the at least one sensor being switchable between a plurality of operating modes; a plurality of functions for evaluating the objects detected, using the object detection sensor, being able to access randomly the at least one sensor and a switchover between the operating modes being selected as a function of the instantaneously accessing assistance functions, and a coordinator is provided between the function evaluation devices and the at least one sensor; each function accessing the at least one sensor transmits to the coordinator a biasing probability distribution function, respectively, and the at least one sensor transmits to the coordinator a detection probability density function for each operating mode that is able to be activated, and the coordinator selects the most suitable operating mode for each function accessing the at least one sensor.

12 Claims, 3 Drawing Sheets

METHOD AND DEVICE FOR CONTROLLING AT LEAST ONE OBJECT DETECTION SENSOR

FIELD OF THE INVENTION

The present invention relates to a method and a device for controlling at least one object detection sensor for a motor vehicle, the at least one sensor being switchable between a plurality of operating modes; a plurality of driver assistance functions for evaluating the objects detected using the object detection sensor being able to access randomly the at least one sensor and a switchover between the operating modes being selected as a function of the instantaneously accessing assistance functions, and a coordinator is provided, between the function evaluation devices and the at least one sensor, each driver assistance function accessing the at least one sensor transmits to the coordinator in each case a biasing probability distribution function, and the at least one sensor transmits to the coordinator a detection probability density function for each measuring mode that is able to be activated, and the coordinator selects the suitable operating mode for each assistance function accessing the at least one sensor.

BACKGROUND INFORMATION

An object detection system, particularly for motor vehicles, is discussed in DE 199 34 670 A1, the object detection system being made up of a combination of at least three object detectors which each have a different detection range and/or a different operating range.

Frequently, object detection systems for motor vehicles have a plurality of different sensor systems which cover different recording ranges, or they have a sensor that can be operated in different operating modes having different recording ranges. Because of the growing number of driver assistance systems in motor vehicles, the object data, ascertained by the object detection sensors, with respect to preceding vehicles and standing objects located ahead, are used by different driver assistance functions, these respective functions evaluating objects in different sensor recording ranges. Such systems are increasing exponentially in their complexity, since the functions and the sensors each have to be adjusted to one another, so that the respective driver assistance functions only process the objects in the recording range of the sensor which are necessary for their functionality, and, in this context, have to switch over the object detection sensor in its operating modes.

SUMMARY OF THE INVENTION

The exemplary embodiments and/or exemplary methods of the present invention is to a method and a device developed in such a way that an object detection sensor only has to know its different operating modes along with the corresponding statistical distribution functions of the object detection positions that are to be expected, just as the corresponding driver assistance functions only have to know the sub-ranges of the sensor detection range in which the objects, which are relevant to their respective functionality, are to be detected. This object is attained by providing a coordinator which, on the one hand, makes available the ranges by the object detection sensor for its respective operating modes in which objects to be detected statistically are to be expected, and on the other hand, informs the coordinator of the driver assistance functions in which sensor recording range parts the objects are to be detected that are required for their functionality. This can be solved by the coordinator in such a way that it correlates the respective distribution density functions with one another, and thus determines the suitable operating mode of the object detection sensor for each driver assistance function, and, corresponding to the instantaneously activated driver assistance function, appropriately switches over the object detection sensor between its operating modes.

According to the exemplary embodiments and/or exemplary methods of the present invention, this is achieved by the features of the independent claims. Advantageous further developments and refinements are derived from the dependent claims.

The biasing probability distribution function advantageously states in which sub-range of the sensor recording range objects are to be evaluated that are particularly relevant for the respective function, by the function giving the biasing probability distribution as a function of the clearance and/or the azimuth angle of the sensor recording range. In this connection, the biasing probability distribution function w can either be unidimensional, in that only the clearance of the detected objects is evaluated, or it can be two-dimensional distribution function which evaluates both the clearance and the azimuth angle of the detected object. The biasing probability distribution function is thereby defined as the vigilance requirement of the driver assistance function in a language that is sensor-independent. In other words, the biasing probability distribution function states at which clearance and/or at which azimuth angle φ those objects to be detected are located that are relevant for this special driver assistance function. For instance, in an automatic emergency braking function it is important especially to detect objects that are present in the near vehicle surroundings, so that possibly the danger of a collision can be recognized. Objects that are farther away, to which the driver or a driver assistance function can still react in timely fashion are irrelevant to the emergency braking function mentioned as an example. In accordance with statistical distribution density functions, the biasing probability distribution function is advantageously normalized so that $$\int_d w(d) \cdot \partial d = 1 \text{ and.}$$

$$\int_d \int_\varphi w(d, \varphi) \cdot \partial \varphi \partial d = 1.$$

That is, the integral of the biasing probability distribution function, integrated over the clearance yields 1, and the integral of the biasing probability distribution function, integrated over the clearance and the azimuth angle yields 1, so as to obtain a dimensionless quantity in each case.

Furthermore, it is advantageous that the detection probability density function states in which sub-range, of the sensor recording range objects are able to be detected particularly well based on the selected operating mode, in that the function gives the detection probability density as a function of the clearance and/or the azimuth angle of the sensor recording range. The detection probability density function is accordingly specified in such a way that it gives the information of the sensor with respect to its different operating modes, depending on in which operating type which sensor recording range is especially covered, or in which sensor recording range there is special resolution accuracy. In other words, the detection probability density function shows where the respective operating mode can detect objects especially well, and in which sensor recording range the most objects are to be expected statistically. The detection probability density function v can also be optionally developed as a unidimensional quantity, which only evaluates the clearance from the detected object, or alternatively, developed as a two-dimensional quantity which takes into consideration both the clearance d and the azimuth angle φ. In accordance with statistical distribution density functions, the detection probability distribution function is also advantageously normalized so that $$\int_d v(d) \cdot \partial d = 1 \text{ and.}$$

$$\int_d \int_\varphi v(d, \varphi) \cdot \partial \varphi \partial d = 1.$$

Thus, if the detection probability density function v is integrated over clearance d, the integral sum is set to equal 1, and if the detection probability density function v is integrated over clearance d and over azimuth angle φ, the integral sum is set to equal 1, so that the detection probability density function is a dimensionless quantity, so that it can later be correlated with biasing probability distribution function w.

Moreover, it is advantageous that the at least one object detection sensor is several sensors which are developed as different sensor types.

It is also advantageous that the different sensor types are ultrasound sensors, pulse radar sensors, frequency-modulated continuous wave (FMCW) radar sensors, lidar sensors and/or video sensors. It can also be provided that a sensor is developed in such a way that it can be switched over between a pulse radar operation and a frequency-modulated continuous wave operation, so that the different operating modes would in this case be pulse radar mode and frequency-modulated continuous wave mode.

The several operating modes of the at least one sensor advantageously have different recording ranges and/or different modulation types of the sensor and/or different resolution accuracies.

It is particularly advantageous that the several functions are one or a particular combination of the driver assistance functions mentioned below. The following are provided as possible driver assistance functions:

an adaptive headway distance control function and speed control function for superhighway-like roads and freeways, also designated as long-range adaptive cruise control (LR-ACC), a stop & go-capable, adaptive headway distance control and speed control for city traffic, which is also designated as short-range adaptive cruise control (SR-ACC), an automatically triggered emergency brake function (NBF), which is intended to avoid or reduce in impact an immediately imminent collision of one's own vehicle with another vehicle, a function which detects a collision situation and warns the driver or changes the triggering threshold of a brake assist device, a tracking function, a lane-leaving warning function and/or a parking assistance.

An additional advantage is that the coordinator supplies the object data gathered using the at least one sensor to the driver assistance function for evaluation, as a function of which the appropriate operating mode was selected. This functionality ensures that the coordinator supplies to the driver assistance function the instantaneously ascertained object data, which has caused the sensor to switch to the just-activated measuring mode.

It is also advantageous that the selection of the operating mode of the at least one sensor, that is to be activated, takes place because of the coordinator, by the correlation of biasing probability distribution function w with detection probability density function v.

Furthermore, it is advantageous that one is able to activate additional assistance functions, which, besides the active functions, are able to access the at least one sensor without having to configure the coordinator and/or the sensor with respect to the additional driver assistance function.

It is also advantageous that a device is provided for correlation evaluation in the coordinator.

Particularly significant is the implementation of the method according to the exemplary embodiments and/or exemplary methods of the present invention in the form of a control element provided for a control unit of a driver assistance function of a motor vehicle, or for a control unit of a sensor of a motor vehicle. In this context, a program that is executable on a computing device, particularly on a microprocessor or signal processor, and which is suitable for implementing the method according to the present invention, is stored in the control element. In this case, the exemplary embodiments and/or exemplary methods of the present invention is therefore implemented by a program stored in the control element, so that this control element, equipped with the program, constitutes the exemplary embodiments and/or exemplary methods of the present invention in the same manner as the method for whose execution the program is suited. In particular, an electrical storage medium, for example a read-only memory, may be used as control element.

Additional features, possible uses and advantages of the exemplary embodiments and/or exemplary methods of the present invention are derived from the following description of exemplary embodiments of the present invention, which are illustrated in the figures of the drawings. In this context, all of the described or represented features, alone or in any combination, form the subject matter of the present invention, regardless of their combination in the patent claims or their antecedent reference, and regardless of their wording and representation in the specification and in the drawings.

Exemplary embodiments of the present invention are described below on the basis of the drawings.

DETAILED DESCRIPTION

Figure 1:
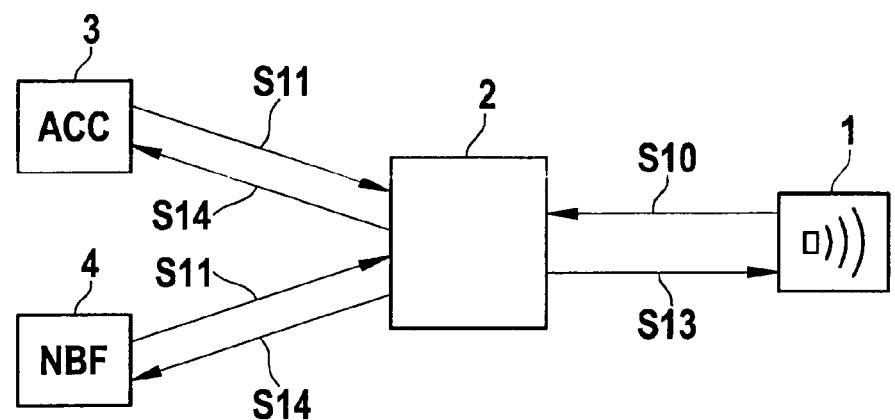
FIG. 1 shows a schematic block diagram of a specific embodiment of the device according to the present invention.

FIG. 1 shows a schematic block diagram of the device according to the present invention. The figure shows an object detection sensor 1 which may be developed as a radar sensor, for example, and has two operating modes, a first operating mode A having a great operating range, and a second operating mode B having a lesser operating range which, however, has a greater resolution accuracy and which ascertains the object positions of the detected objects in shorter measuring cycles than operating mode A. A coordinator 2 is also shown which links object detection sensor 1 to a plurality of driver assistance functions. Two functions are shown in exemplary fashion as driver assistance functions, first driver assistance function 3 carrying out an ACC function which performs a clearance regulation on superhighway-like country roads or freeways, in order to regulate the speed of one's own vehicle in the sense of a constant clearance regulation from behind a preceding vehicle that has been recognized as target object. As a further driver assistance function 4, examined in an exemplary fashion, an automatically triggered emergency brake function is shown, which, as a function of detected objects located ahead, ascertains whether a collision of one's own vehicle with a detected object is probable and, in the case where a collision is no longer avoidable, carries out an automatically triggered and automatically executed emergency braking. However, any number of other driver assistance functions are possible as driver assistance functions 3, 4 which detect objects in the vehicle's surroundings using surroundings recording sensors, and driver assistance functions which, as a function of the detected sensor data, issue driver warnings or make interventions in the drive train or the deceleration devices of the vehicle.

In addition, object detection sensor 1 is in a position, as indicated by arrow S10, to transmit a detection probability density function $v_i(d,\phi)$ to coordinator 2 for each possible operating mode which object detection sensor 1 can activate. According to arrows S11, driver assistance functions 3, 4 are also in a position to transmit to coordinator 2 a biasing probability distribution function $w_i(d,\phi)$, respectively. Coordinator 2 correlates each detection probability density function $v_i$ present in it with each biasing probability distribution function $w_i$ present in it, and determines the combination having the greatest correlation result for each connected driver assistance function 3, 4. Since object detection sensor 1 is in most cases operable in only one operating mode at one point in time, coordinator 2 thereupon informs object detection sensor 1 (as shown by arrow S13) which operating mode of sensor 1 is most suitable for which driver assistance function 3, 4, or rather, which operating mode is the most urgent. Thus, for instance, shortly before an unavoidable collision, that operating mode is selected which is most favorable for the emergency braking function (NBF), whereas in normal operation, for example, a constant switching over between operating modes is conceivable. Object detection sensor 1 then sends the object data acquired in the respective operating modes to coordinator 2, which passes them on to appropriate driver assistance function 3, 4 for further evaluation. This shows that, during the operation, additional driver assistance functions can be activated without sensor 1 having to be configured ahead of time to the respectively newly activated driver assistance function, or rather that the sensor does not have to be configured to the especially relevant detection range for this driver assistance function.

Figure 2:
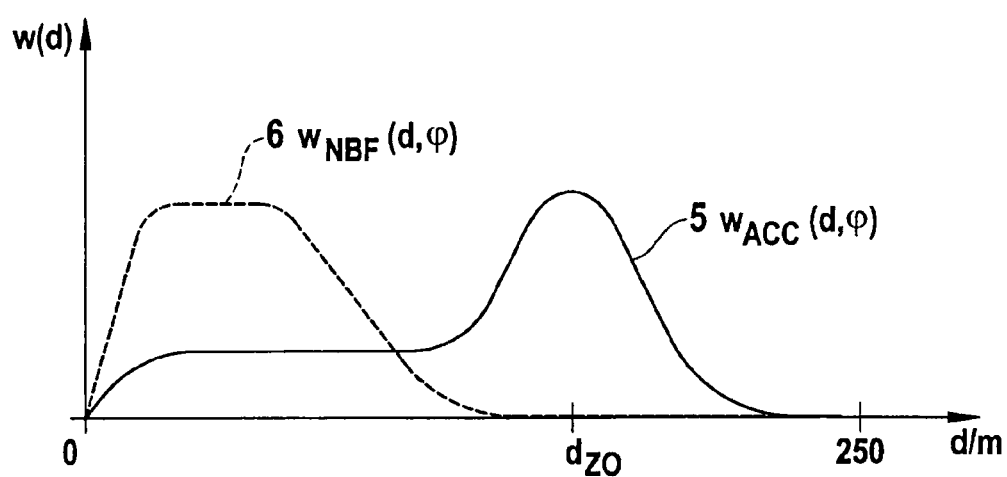
FIG. 2 shows a biasing probability distribution function diagram of a first and a second driver assistance function.

In FIG. 2, biasing probability distribution functions 5, 6 are shown as a function of clearance d. The functions described in the exemplary embodiments are shown only as unidimensional functions, as a function of d, for reasons of easier comprehensibility, but they could also be developed without a problem as multidimensional functions, as a function of, for instance, d and $\phi$. Driver assistance function 3, which is an ACC function, regulates the vehicle speed on expressways to that of preceding vehicles, which usually travel ahead at a certain following clearance $d_{ZO}$, so that the biasing probability distribution function $w_{ACC}(d,\phi)$ of the ACC function, represented by curve 5, has an increased biasing probability distribution in the area around target object clearance $d_{ZO}$.

Objects that travel ahead of one's own vehicle at a distance greater than target object clearance $d_{ZO}$ are of subordinate importance for ACC function 3, so that biasing probability distribution function $w_{ACC}$ tends to zero for clearances of $d>d_{ZO}$. Objects traveling ahead which have a lesser clearance than target object clearance $d_{ZO}$ ($d<d_{ZO}$) are also of subordinate importance for the clearance regulating function, since these occur very rarely in expressway operation, which do have implications for the speed regulating function, but which do not correspond to the usual regulating situation. That is why biasing probability distribution function $w_{ACC}$ has a small biasing probability distribution for clearances of $d<d_{ZO}$. Biasing probability distribution function $w_{ACC}(d,\phi)$, as shown by curve 5, is passed on to coordinator 2 by ACC function 3 according to arrow S11. Analogous to this, an additional biasing probability distribution function $w_{NBF}(d,\phi)$ is plotted, in the form of curve 6, which is transmitted to coordinator 2 by emergency braking function 4, according to arrow S11 in FIG. 1.

The emergency braking function has the task of establishing whether a collision with a preceding vehicle is imminent, so as possibly to trigger and carry out an automatic emergency braking. For this, objects having a low clearance d are particularly relevant, since these have a greater collision probability than preceding objects that are at a far distance. Accordingly, the biasing probability distribution function $w_{NBF}(d,\phi)$ is developed in such a way that it has a high biasing probability distribution at a low clearance d, and this decreases with increasing clearance d.

Figure 3A:
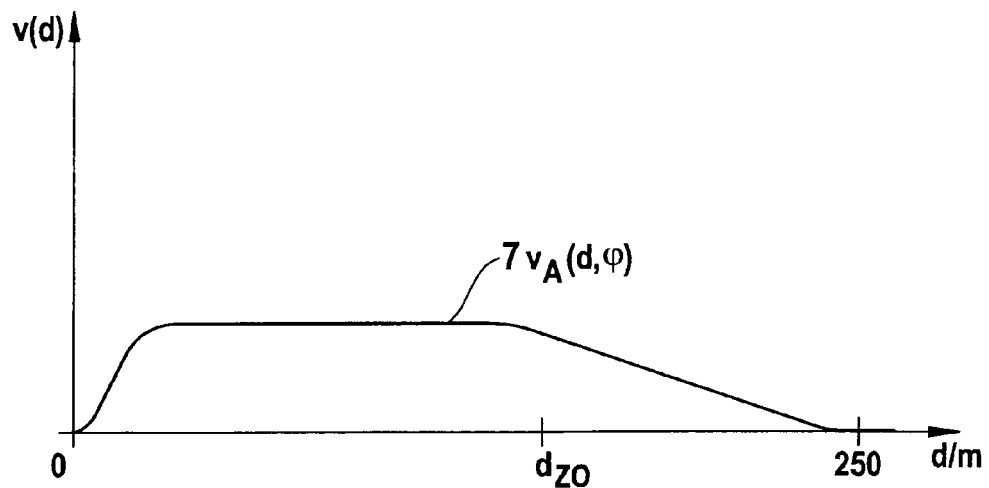
FIGS. 3a and 3b show a detection probability density function diagram of a first and a second operating mode respectively of the sensor.
Figure 3B:
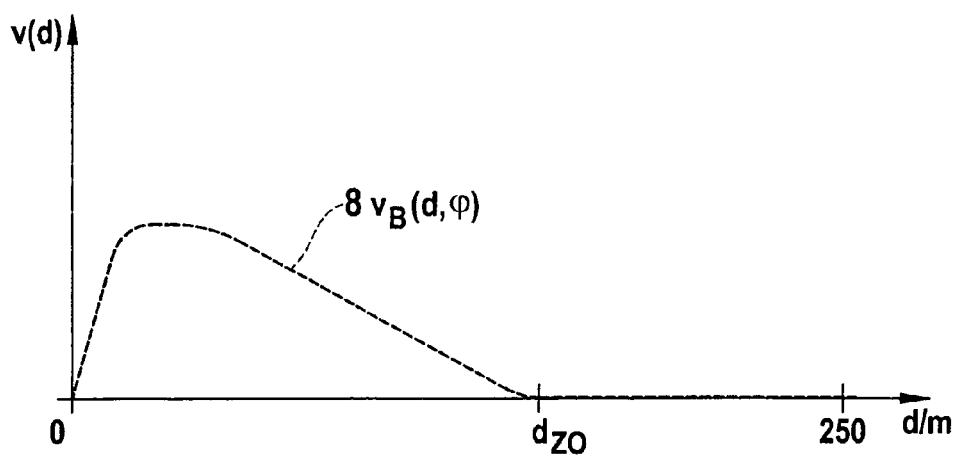

In FIGS. 3a and 3b, detection probability density function $v_i(d,\phi)$ is shown for each operating mode of object detection sensor 1. As was described for FIG. 1, sensor 1 has a remote area mode A that is characterized by its large operating range. With respect to this remote area mode A, FIG. 3a shows a detection probability density function $v_A(d,\phi)$ according to curve 7. This function illustrates at which distance ranges in a respective operating mode one should count on objects to be detected first. According to this, curve 7 of remote area mode A is shaped so that it runs approximately constantly up to clearance $d=d_{ZO}$, and thereafter, for instance, up to the maximum operating range of the sensor at d=250 meter, decreases to zero. Detection probability density function $v_B(d,\phi)$ according to curve 8 is plotted correspondingly in FIG. 3b, which, based on close range mode B is adjusted especially to record objects to be detected at close range before the vehicle, that is, at small clearances d. These two detection probability density function $v_A$ and $v_B$ are passed on to coordinator 2 by object detection sensor 1, according to arrow S10 of FIG. 1.

Coordinator 2 now performs correlations of all the biasing probability distribution functions $w_i$ transmitted to it and all the detection probability density functions $v_i$, and ascertains for each driver assistance function 3, 4 a measuring mode A, B that is suitable at the soonest. The correlations to be performed by coordinator 2 are entered, for instance, in the following table:

|  | Measuring mode A $v_A(d, \phi)$ | Measuring mode B $v_B(d, \phi)$ | Greatest correlation coefficient r at |
|---|---|---|---|
| ACC function $w_{ACC}(d, \phi)$ | $r[w_{ACC}(d, \phi);$ $v_A(d, \phi] \approx 0.8$ | $r[w_{ACC}(d, \phi);$ $v_B(d, \phi)] \approx 0.2$ | $\rightarrow r[ACC; A]$ |

-continued

| | Measuring mode A $v_A(d,\phi)$ | Measuring mode B $v_B(d,\phi)$ | Greatest correlation coefficient r at |
|---|---|---|---|
| NBF-function $v_{NBF}(d,\phi)$ | $r[w_{NBF}(d,\phi); v_A(d,\phi)] \approx 0.3$ | $r[w_{NBF}(d,\phi); v_B(d,\phi)] \approx 0.7$ | →r[NBF; B] |

According to the first line in the table, coordinator 2 performs a correlation of biasing probability distribution function $w_{ACC}(d,\phi)$ with detection probability density function $v_A(d,\phi)$. Since curve 5 of FIG. 2 and curve 7 of FIG. 3A, which are correlated with each other, have quantitatively agreeing areas at the same clearances, a correlation coefficient r[ACC; A] is created of, for example, 0.8. Subsequently, biasing probability distribution function $w_{ACC}$ is correlated with detection probability density function $v_B$, according to FIG. 3b, a correlation result r[ACC;B] being created, of about 0.2, since between curves 5 and 8 imbalances exist at same clearances d, which leads to a low correlation. Consequently, for function 3 which, for example, was assumed to be an ACC function, all operating modes A, B were correlated using the corresponding biasing probability distribution function $w_{ACC}$.

Since correlation coefficient r[ACC; A] is greater than correlation coefficient r[ACC; B], operating mode A of object detection sensor 1 is better suited than operating mode B for first function 3 that was assumed, for example, as clearance regulating function. In the same way, correlations are carried out for additional function 4, which was assumed to be an emergency braking function, according to the line in the table "emergency braking function" [NBF], r[NBF;A], for example, 0.3 and r[NBF;B], for example 0.7 having been determined as correlation coefficients. This yields for second function 4 that the operating mode having the highest correlation coefficient, that is, in this example, close range mode B, is the most suitable for detecting relevant objects for an emergency braking function. Coordinator 2 outputs this result to object detection sensor 1, according to arrow S13 in FIG. 1, which then selects remote area mode A for measurements for clearance regulation function 3, and close range mode B of object detection sensor 1, that is more suitable for this, for object detections for emergency braking function 4. The object values ascertained by sensor 1 are passed on to coordinator 2, which passes the measured values on to the corresponding driver assistance functions 3, 4 for evaluation, depending on in which operating mode A, B they were ascertained.

Figure 4:
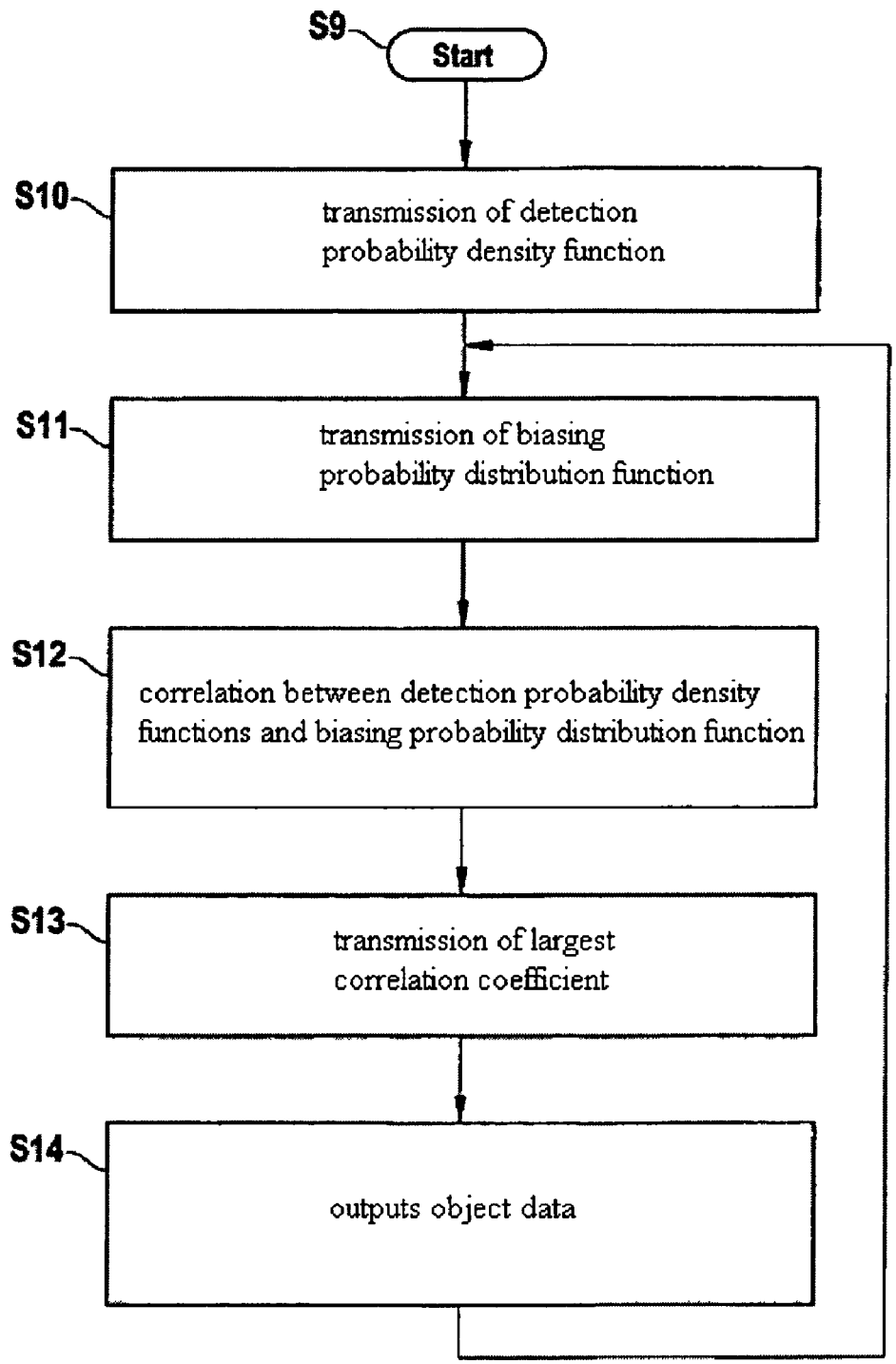
FIG. 4 shows a flow chart of a specific embodiment of the method according to the present invention.

FIG. 4 shows a schematic flow chart of the method according to the present invention, which begins in step S9, for instance, upon the activation of a driver assistance function, or in response to the ignition of the vehicle. According to step S10, sensor 1 next transmits to coordinator 2 a detection probability density function $v_i(d,\phi)$ respectively for each operating mode A, B that is operable by it. In the following step S11, each active driver assistance function 3, 4 transmits a biasing probability distribution function $w_i(d,\phi)$ in each case, which is stored, appropriate to its functionality, in the respective function evaluation device 3, 4. In the following step S12, coordinator 2 performs all possible correlations between detection probability density functions $v_i(d,\phi)$ and biasing probability distribution function $w_i(d,\phi)$, and ascertains for each active driver assistance function 3, 4 the operating mode A, B which yielded the largest correlation coefficient.

In following step S13, coordinator 2 transmits to sensor 1 the operating mode A, B for which the largest correlation coefficient r was established, and it does this for each activated driver assistance function 3, 4. In subsequent step S14 it may be provided, for example, that sensor 1 stores the most suitable operating mode A, B for each assistance function 3, 4 accessing it, and that it outputs object data $(d,\phi)$, gathered in the respectively switched off operating mode A, B, to coordinator 2, which passes on these data, corresponding to selected operating mode A, B, to the appropriate assistance function 3, 4 for evaluation. After that, the method is continued in step S11, so that the most suitable operating modes A, B are allocated anew to active driver assistance functions 3, 4.

This method and this device have the great advantage that new driver assistance functions can be activated at any time, and that possibly a plurality of detection sensors can be connected to coordinator 2. Depending on which object detection sensors 1 are active instantaneously and which operating modes are active, the driver assistance function is assigned to the operating mode of each possible object detection sensor 1 that is best suited for it. It could happen, for instance, that a video sensor or a lidar sensor is automatically deactivated in response to intense rain or in response to a thick fog, since it is no longer able to supply reliable data. In this case, the driver assistance functions that depend on this sensor are no longer supplied with object data by the video sensor, but by the operating mode of an object detection sensor 1 which is still in operation, in spite of the poor visibility conditions. It is also possible to switch on and switch off driver assistance systems automatically at any time, without a new sensor configuration being required for this.

What is claimed is:

1. A method for controlling at least one object detection sensor for a motor vehicle, the at least one sensor being switchable between a plurality of operating modes, the method comprising:
    using a plurality of driver assistance functions for evaluating objects detected using the object detection sensor to access randomly the at least one sensor; and
    selecting a switchover between the operating modes as a function of the instantaneously accessing driver assistance function;
    wherein there is a coordinator between function evaluation devices and the at least one sensor, each driver assistance function accessing the at least one sensor transmitting to the coordinator a biasing probability distribution function $(w_i(d,\phi))$ respectively, and the at least one sensor transmitting to the coordinator a detection probability density function $(v_i(d,\phi))$ for each activatable operating mode, and the coordinator selects a most suitable operating mode for each driver assistance function accessing the at least one sensor.

2. The method of claim 1, wherein the biasing probability distribution function $w_i(d,\phi)$ states in which sub-range of a sensor recording rang;
    objects are to be evaluated that are particularly relevant for the respective driver assistance function, by the driver assistance function giving the biasing probability distribution as a function of at least one of a clearance and an azimuth angle of the sensor recording range.

3. The method of claim 1, wherein the detection probability density function $(v_i(d,\phi))$ states in which sub-range of a sensor recording range, objects are particularly well detectable based on a selected operating mode by the driver assistance function giving the detection probability density function as a function of at least one of a clearance and an azimuth angle of the sensor recording range.

4. The method of claim 1, wherein the at least one object detection sensor includes a plurality of sensors that are different sensor types.

5. The method of claim 4, wherein the different sensor types includes at least one of ultrasound sensors, pulse radar sensors, frequency-modulated continuous wave (FMCW) radar sensors, lidar sensors and video sensors.

6. The method of claim 1, wherein the plurality of operating modes of the at least one sensor have at least one of different recording ranges, different modulation types of the sensor and different resolution accuracies.

7. The method of claim 1, wherein the plurality of driver assistance functions include at least one of:
- an adaptive clearance regulating function and speed regulating function for enlarged country roads and superhighways (LR-ACC),
- a stop & go-capable, adaptive clearance regulating function and speed regulating function for city traffic (SR-ACC),
- an automatically triggering emergency braking function (NBF),
- a function which detects a collision situation and warns the driver or changes the triggering threshold of a brake assist device,
- a tracking function (LKS),
- a lane-leaving warning function (LDW), and
- a parking assistance (EPH).

8. The method of claim 1, wherein the coordinator supplies an object data, gathered using the at least one sensor, to the driver assistance function for evaluation, as a function of which an appropriate operating mode was selected.

9. The method of claim 1, wherein a selection of an operating mode, to be activated, of the at least one sensor by the coordinator takes place by a correlation of the biasing probability distribution function ($w_i(d,\phi)$) with the detection probability density function ($v_i(d,\phi)$).

10. The method of claim 1, wherein additional driver assistance functions are activatable, which, besides active functions, are able to access the at least one sensor without having to at least one of reconfigure the coordinator and the sensor with respect to the additional driver assistance function.

11. A device for controlling at least one object detection sensor for a motor vehicle, comprising:
- at least one sensor being switchable between a plurality of operating modes, a plurality of driver assistance functions for evaluating the objects detected using the object detection sensor being able to access randomly the at least one sensor and a switchover between the operating modes being selected as a function of the instantaneously accessing driver assistance function; and
- a coordinator between function evaluation devices and the at least one sensor;
- wherein each driver assistance function accessing the at least one sensor transmits to the coordinator a biasing probability distribution function ($w_i(d,\phi)$) respectively, and the at least one sensor transmits to the coordinator a detection probability density function ($v_i(d,\phi)$) for each activatable operating mode, and the coordinator selects the most suitable operating mode for each driver assistance function accessing the at least one sensor.

12. The device of claim 11, wherein a device for correlation evaluation is in the coordinator.

* * * * *